(12) United States Patent
Johnson, Jr.

(10) Patent No.: US 6,567,788 B1
(45) Date of Patent: May 20, 2003

(54) PROGRAMMED LOGISTIC SYSTEM AND METHOD FOR TRANSPORTATION AND RECEPTION OF COMMODITIES

(75) Inventor: Ralph B. Johnson, Jr., Clifton, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 388 days.

(21) Appl. No.: 09/129,088

(22) Filed: Aug. 5, 1998

(51) Int. Cl.[7] .............................................. G06F 17/60
(52) U.S. Cl. ...................................................... 705/28
(58) Field of Search ................................ 705/28, 10, 9, 705/7

(56) References Cited

U.S. PATENT DOCUMENTS

| | | | | |
|---|---|---|---|---|
| 4,049,131 A | * | 9/1977 | Schrader et al. | 414/139.9 |
| 5,450,317 A | * | 9/1995 | Lu et al. | 705/10 |
| 5,485,369 A | * | 1/1996 | Nicholls et al. | 705/9 |
| 5,615,711 A | * | 4/1997 | Lewis | 138/149 |
| 5,708,230 A | * | 1/1998 | Woodall, Jr. et al. | 102/402 |
| 5,930,762 A | * | 7/1999 | Masch | 705/7 |

* cited by examiner

*Primary Examiner*—Eric W. Stamber
*Assistant Examiner*—John Leonard Young
(74) *Attorney, Agent, or Firm*—Jacob Shuster

(57) ABSTRACT

Quantities of commodities are transported in sequence from a source to a receiving location in accordance with a logistic program through which constraints based on conditions at the source and receiving location are imposed so as to regulate timing of commodity transport involving a minimized number of sequential transits during usage for delivery at a rate in excess of the usage rate to maintain a specified inventory reserve at the receiving location.

8 Claims, 1 Drawing Sheet

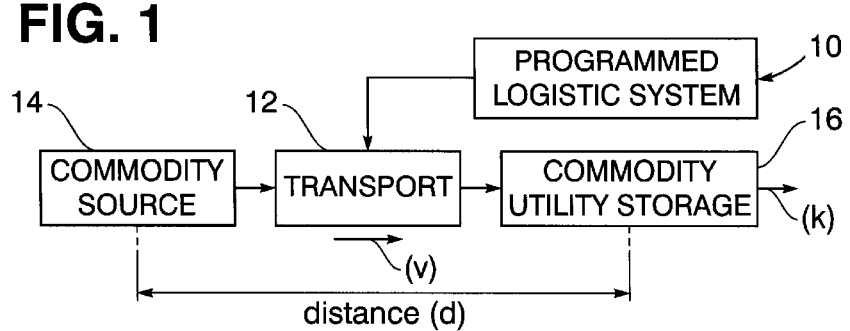
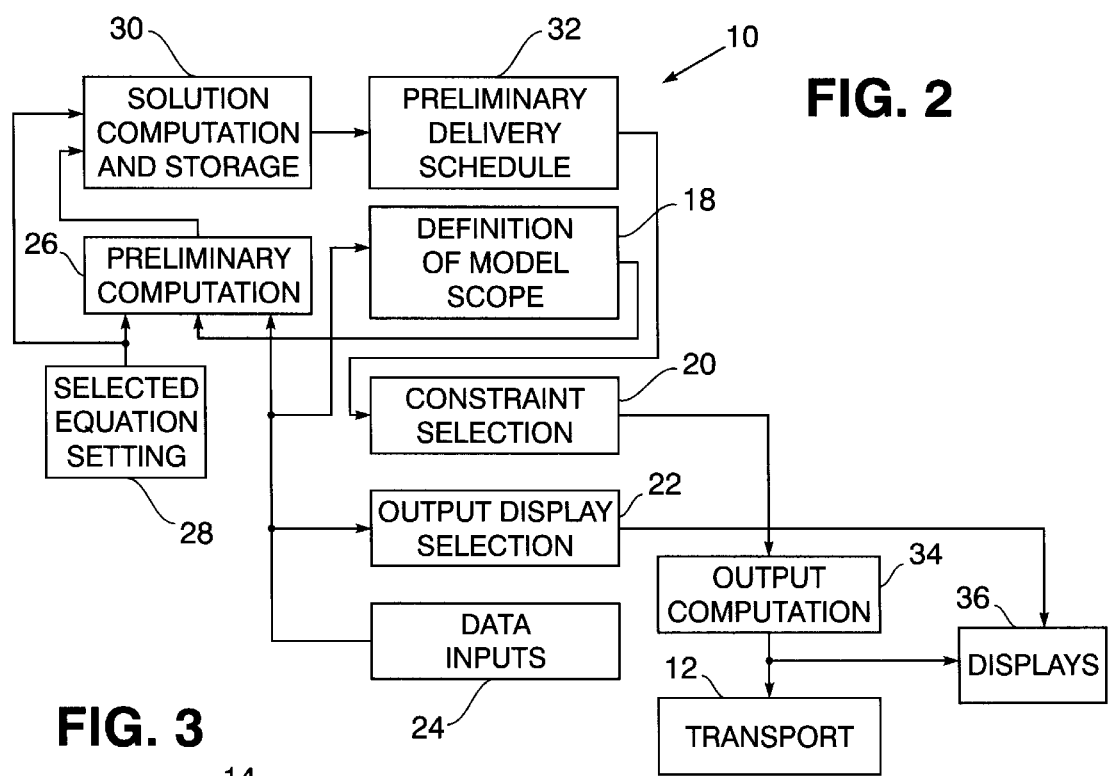
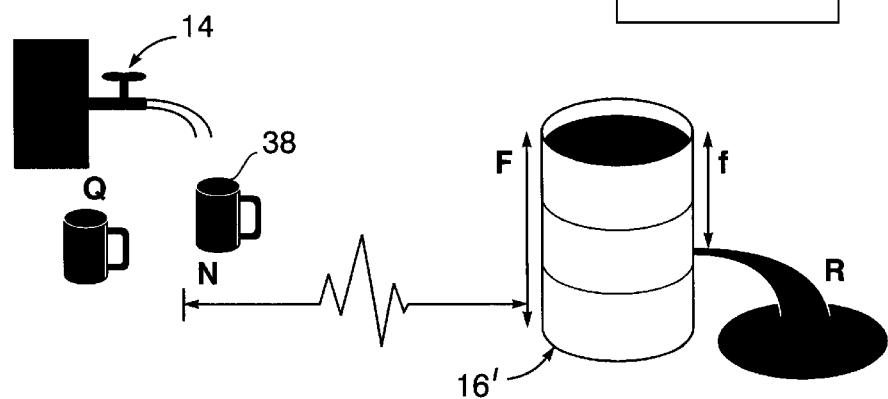

PROGRAMMED LOGISTIC SYSTEM AND METHOD FOR TRANSPORTATION AND RECEPTION OF COMMODITIES

The present invention relates in general to logistic programming of commodity transport between commodity sources and receiving locations at which commodity usage occurs.

BACKGROUND OF THE INVENTION

There are already methods for addressing logistic problems, which include use of discrete time step simulations limited by many operational rules and small parameter changes. It is therefore an important object of the present invention to avoid the inaccuracies and prolongations of prior logistic systems by reducing the number and types of transport for sustaining different activities involving usage of commodities at receiving locations spaced distance-wise from sources of such commodities.

SUMMARY OF THE INVENTION

Pursuant to the present invention, unit quantities of commodities are sequentially transported in accordance with a logistic program during specified periods of time from commodity sources to receiving locations at which usage occurs at some rate, exceeded by the delivery rate of such commodities so as to maintain or store a specified reserve quantity of the commodity at the receiving location. The logistic program also takes into account different constraints on transport timing and capacity including the total number of commodity transits during the specified time of commodity usage, based on conditions of the commodity sources and usage activities at the receiving locations. Also, the logistic programming according to one embodiment of the invention applied imposes a schedule of commodity delivery to the receiving locations so as to minimize the total number of transits. Such logistic programming is applicable to military planning involving on-shore maneuvering military forces at the receiving locations to which commodities are delivered from maneuvering ships at sea as the commodity sources. Other commercial planning activities may also benefit from the same type of logistic program made applicable thereto, such as the delivery of water from a dispenser by transport in cups to a utility storage barrel. A print-out of a logistic program associated with the aforementioned military planning embodiment of the present invention to compute military force sustainment pursuant to the present invention, is attached hereto by way of example as an appendix.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 1 is a diagram illustrating a utility model for a logistic program covered by the present invention;

FIG. 2 is a more detailed diagram of the logistic program associated with the model diagrammed in FIG. 1, in accordance with one embodiment; and FIG. 3 is an illustration of simplified utility model to which a logistic program of the present invention is applicable.

DETAILED DESCRIPTION OF PREFERRED EMBODIMENTS

Referring now to the drawing in detail, FIG. 1 diagrams a utility model subject to control of a programmed logistic system 10. Such model involves the transport 12 of commodities from a source 14 to a utility storage 16 at a receiving location spaced a distance (d) from the source 14. With reference to the diagrammed model, the source 14 may dispense a number (N) of commodity units of quantity (Q) for delivery by the transport 12 to the location of the commodity utility storage 16 from which the commodity is discharged at a usage rate (R). The timing associated with transport 12 of the commodity from source 14 is denoted as (L) hours, while the timing of reception at the location of storage 16 is denoted as (U) hours. The transit speed along distance (d) associated with the transport 12 is denoted as (v) in FIG. 1. Accordingly, the time for transit of a quantity (Q) of the commodity is (L+U+2 d/V), from which a delivery rate is achieved greater than the usage discharge rate (R) from the storage 16. Other relationships derived from the illustrated model include: N=R/Q and (Time between deliveries) TBD=Q/R. The foregoing relationships are utilized in the logistic system 10 to control commodity transport 12.

According to certain embodiments of the present invention, transport 12 forms part of a sea-based type of sustainment model subject to control by the programmed logistic system 10, wherein the source 14 is a plurality of maneuvering ships at sea while the commodity storage 16 represents multiple on-shore military forces engaged in different activities. As to the transport 12, it involves multiple sequential transfer of different types of commodities, including personnel and equipment for use by the military forces. The logistic system 10 is programmed to compute transport types and numbers, timing and constraints in connection with commodity transit. In addition to the constraint imposed by system 10 on the total number (N) of transits for transport 12, other constraints are imposed including commodity storage capacity (F) at the locations of maneuvering forces 16 and commodity availability from the maneuvering ships forming the source 14. Accordingly, the programming system must also take into account time variations associated with the usage rates (R) and the other constraints in order to minimize the total number (N) of transits required to maintain storage inventories above specified reserves of forces at the location 16 by delivery at rates greater than the commodity usage rates (R).

The computer program associated with the logistic system 10, is diagrammed in FIG. 2 showing a plurality of functional sections thereof through which programming operations are performed in sequence. The program is initiated through section 18 establishing the overall problem being dealt with by scope definition of the model diagrammed in FIG. 1. Such operation is followed by operator selection of constraints imposed by the system through a section 20 preceding selection of output displays through section 22. Data inputs pertaining to conditions at the source 14 and storage 16 are then applied through section 24 to section 18 and to a preliminary computation section 26 also receiving inputs from section 18 and the next section 28 through which the selected equation setting is established. Based on outputs from sections 26 and 28, a solution computation and data storage operation is performed by section 30 from which an output is applied to a preliminary delivery schedule section 32. The output of section 32 is applied to the constraint selection section 20 from which an output is applied together with an output from the section 22 to the output computation section 34, with which the displays 36 are associated, for control of transport 12 as hereinbefore described.

Within section 18 of the program, the scope of the overall model situation being dealt with is defined by adjustment in the numbers of forces and commodities, types of transport and commodity use rates. Under selection control of section 20, the operator may specify deliveries to forces associated with utility storage 16 regardless of other computations in the program, involving the inclusion or exclusion of constraints on the total number of transits (N) of available types during, specified time periods. The output selection section 22 selects the variables to be computed for transport control and display through sections 34 and 36, involving display of pre-solution outputs related to movement of forces and ships over time; distances of ships from each other over time; optional force inventories of commodities; estimated force usage in terms of use rates, distance, transport spots; and comparison of force capacities and use rates. Also included are post-solution outputs involving displays of solutions over time with respect to ships and transport types and commodity use per ship, as well as listings of schedules for forces and ships and display of force inventory. Data inputs to sections 22, 20, 26 and 18 include conditions such as the force use rates; ship location and availability; capacities for force commodities and transports; and other transport characteristics such as combat radius, load time, weight and volume. The preliminary computation section 26 performs those operations necessary to meet the size of the problem input from section 18. The set of equations for use in sections 26 and 30 is established by the selected equation setting section 28, so as to establish through section 30 the minimum number of total transits required by the output of preliminary delivery schedule section 32 applied to the constraint selection section 20. As a result of the foregoing described arrangement of program sections, the minimum number and type of transits effected is established through transport 12 so as to satisfy force demands, by trading off numbers and types of transits selected and specifying a best mix of commodities for transit loading in order to achieve the computed minimum number.

FIG. 3 illustrates a simplified foundation model subject to programmed logistic control made applicable to commercial processes. The commodity source is in the form of a dispenser 14' from which quantities (Q) of water, as the commodity, fill a number (N) of cups 38. The filled cups 38 represent the transport facilities that deliver quantities (Q) of the water commodity a distance (d) to a barrel 16' as the utility storage having a capacity (F), from which a force working capacity fraction (f) is discharged at a usage rate (R). The equations hereinbefore set forth are derived from the foregoing model diagrammed in FIG. 3 in order to minimize the total number (N) of cups 38 as transit units utilized, subject to: (a) commodity delivery rates greater than the usage rates (R); and (b) constraints involving: commodity capacities of barrels 16'; number of transits; number of load spots and commodity availability at the dispenser source or base 14'.

Obviously, other modifications and variations of the present invention may be possible in light of the foregoing teachings. It is therefore to be understood that within the scope of the appended claims the invention may be practiced; otherwise than as specifically described.

What is claimed is:

1. In combination with delivery of commodities from a source to a receiving location at which usage of the commodities occurs at a certain rate, a programmed logistic system for planning said delivery of the commodities during said usage thereof, comprising: transport means for sequential transit of unit quantities of said commodities from the source to the receiving location; means for preselecting constraints to be imposed on the transport means dependent on conditions at the source and the receiving location, including total number of the transits; means for computing rate of delivery of the commodities at the receiving location by the transport means under said constraints; and means imposing scheduling on said transport means for minimizing said total number of the transits to the receiving location at said rate of delivery in excess of said certain rate of the usage to maintain a reserve inventory of the commodities at said receiving location.

2. The system as defined in claim 1 wherein said source of the commodities is a plurality of ships at sea while said receiving location is established on shore by military forces to which the commodities are transferred by the transport means and through which the commodities undergo said usage.

3. The system as defined in claim 2 wherein said constraints further include: availability of the commodities in the ships at sea and capacities of the military forces for receiving and storing the commodities.

4. The system as defined in claim 1 wherein said constraints further include: availability of the commodities at the source, and capacities for receiving and storing the commodities at the receiving location.

5. In combination with delivery of commodities from a source to a receiving location at which usage of the commodities occurs at a certain rate, a programmed logistic method for planning said delivery of the commodities during said usage thereof, comprising the steps of: sequentially transporting quantities of the commodities from the source to the receiving location; preselecting constraints to be imposed on said sequential transporting of the commodities dependent on conditions at the source and the receiving location and a total number of transits of the commodities; computing rate of delivery of the commodities at the receiving location under said constraints; and scheduling said sequential transporting of the commodities for minimizing the total number of transits establishing said delivery at said computed rate in excess of said certain rate of the usage to maintain a reserve inventory of the commodities at said receiving location.

6. The method as defined in claim 5 wherein said constraints further include: availability of the commodities at the source, and capacities for receiving and storing the commodities at the receiving location a predetermined distance from the source.

7. The method as defined in claim 6 wherein said source of the commodities is a plurality of ships at sea while said receiving location is established on shore by military forces to which the commodities are transferred by said step of sequentially transporting.

8. The method as defined in claim 5 wherein said source is a dispenser of water as the commodities transported in cups to a storage barrel at said receiving location.

\* \* \* \* \*